(12) United States Patent
Xi et al.

(10) Patent No.: US 10,061,455 B2
(45) Date of Patent: Aug. 28, 2018

(54) ARRAY SUBSTRATE, DISPLAY PANEL AND DISPLAY DEVICE

(71) Applicants: Shanghai AVIC OPTO Electronics Co., Ltd., Shanghai (CN); Tianma Micro-electronics Co., Ltd., Shenzhen (CN)

(72) Inventors: Kerui Xi, Shanghai (CN); Zhaokeng Cao, Shanghai (CN); Tingting Cui, Shanghai (CN)

(73) Assignees: Shanghai AVIC OPTO Electronics Co., Ltd., Shanghai (CN); Tianma Micro-electronics Co., Ltd., Shenzhen (CN)

( * ) Notice: Subject to any disclaimer, the term of this patent is extended or adjusted under 35 U.S.C. 154(b) by 169 days.

(21) Appl. No.: 15/154,502

(22) Filed: May 13, 2016

(65) Prior Publication Data

US 2017/0168605 A1 Jun. 15, 2017

(30) Foreign Application Priority Data

Dec. 11, 2015 (CN) .......................... 2015 1 0923077

(51) Int. Cl.
*G06F 3/044* (2006.01)
*G06F 3/046* (2006.01)
*G09F 3/20* (2006.01)
*G06F 3/041* (2006.01)
*G09G 3/20* (2006.01)

(52) U.S. Cl.
CPC ............ *G06F 3/044* (2013.01); *G06F 3/0412* (2013.01); *G06F 3/0416* (2013.01); *G09G 3/20* (2013.01)

(58) Field of Classification Search
CPC .......... G06F 3/0412; G06F 3/01; G06F 3/044; G06F 3/0416; G06F 3/046; G02F 1/1362; G09G 3/20; G09G 3/3648
See application file for complete search history.

(56) References Cited

U.S. PATENT DOCUMENTS

| 2008/0062140 A1* | 3/2008 | Hotelling | G09G 3/3648 345/173 |
| 2010/0194695 A1* | 8/2010 | Hotelling | G06F 3/0412 345/173 |
| 2013/0147724 A1* | 6/2013 | Hwang | G06F 3/0412 345/173 |

(Continued)

FOREIGN PATENT DOCUMENTS

| CN | 103279245 A | 9/2013 |
| CN | 102375258 B | 10/2014 |

(Continued)

*Primary Examiner* — Jennifer Mehmood
*Assistant Examiner* — James Nokham
(74) *Attorney, Agent, or Firm* — Anova Law Group, PLLC

(57) ABSTRACT

An array substrate, a display panel, and a display device are provided. The array substrate comprises a touch circuit including a plurality of first switching units, a controlling unit, and a plurality of touch detecting terminals, and a plurality of independent touch electrodes arranged in an array. The touch electrode is electrically connected to the touch detecting terminal through at least one first switching unit. When the array substrate is in a touch detecting stage, the controlling unit controls the first switching units to be turned on, such that the touch electrodes are progressively detected.

16 Claims, 12 Drawing Sheets

(56) References Cited

U.S. PATENT DOCUMENTS

| | | | | |
|---|---|---|---|---|
| 2013/0335343 A1* | 12/2013 | Lee | ............................ | G06F 3/01 345/173 |
| 2014/0111466 A1* | 4/2014 | Kim | ........................ | G06F 3/044 345/174 |
| 2014/0168127 A1* | 6/2014 | Yang | ...................... | G06F 3/0412 345/173 |
| 2014/0168157 A1* | 6/2014 | Yang | ........................ | G06F 3/044 345/174 |
| 2014/0210774 A1* | 7/2014 | Kim | ........................ | G06F 3/044 345/174 |
| 2014/0240279 A1* | 8/2014 | Hwang | .................. | G06F 3/0412 345/174 |
| 2014/0354572 A1* | 12/2014 | Zhao | ..................... | G06F 3/0416 345/173 |
| 2016/0342276 A1* | 11/2016 | Lu | ......................... | G02F 1/1362 |

FOREIGN PATENT DOCUMENTS

| | | | |
|---|---|---|---|
| CN | 104699350 | A | 6/2015 |
| CN | 104699352 | A | 6/2015 |
| CN | 104777942 | A | 7/2015 |
| CN | 104793827 | A | 7/2015 |
| JP | 2012226498 | A | 11/2012 |
| KR | 20120015219 | A | 2/2012 |

\* cited by examiner

ARRAY SUBSTRATE, DISPLAY PANEL AND DISPLAY DEVICE

CROSS-REFERENCES TO RELATED APPLICATIONS

This application claims priority of Chinese Patent Application No. 201510923077.0, filed on Dec. 11, 2015, the entire contents of which are hereby incorporated by reference.

FIELD OF THE INVENTION

The present disclosure generally relates to the field of display technology and, more particularly, relates to an array substrate, a display panel including the array substrate, and a display device thereof.

BACKGROUND

With the development of display technology, touch control displays have been widely used in many fields and industries of modern societies. A touch control display, also known as a "touch screen" or a "touch panel", is a piece of equipment that allows a user to select the content to be displayed by entering the user instructions through touching on the screen or panel using fingers or other physical objects (e.g., stylus). When an icon on the touch screen is touched by the user's fingers or other physical objects, the touch display detects the corresponding touching position, and displays the desired content based on the user instructions.

According to their operation principles, touch displays may be classified into two categories: capacitive touch displays and resistive touch displays. In particular, capacitive touch displays are often classified into touch displays based on self-capacitance and touch displays based on mutual-capacitance. However, the current touch displays based on self-capacitance may have certain issues, such as complicated touch structure, complex wirings, large occupied area, which may be unfavorable for thinner and lighter display devices.

The disclosed array substrate, display panel, and display device thereof are directed to solve one or more problems set forth above and other problems.

BRIEF SUMMARY OF THE DISCLOSURE

One aspect of the present disclosure provides an array substrate. The array substrate comprises a touch circuit including a plurality of first switching units, a controlling unit, and a plurality of touch detecting terminals, and a plurality of independent touch electrodes arranged in an array. The touch electrode is electrically connected to the touch detecting terminal through at least one first switching unit. When the array substrate is in a touch detecting stage, the controlling unit controls the first switching units to be turned on, such that the touch electrodes are progressively detected.

Another aspect of the present disclosure provides a display panel comprising the array substrate thereof.

Another aspect of the present disclosure provides a display device comprising the display panel thereof.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention. Further, in the present disclosure, the disclosed embodiments and the features of the disclosed embodiments may be combined under conditions without conflicts.

The In-Cell touch displays based on self-capacitance (i.e., the touch electrodes are disposed on an inner surface of the substrate) often includes a touch component for realizing touch functions and a display component for realizing display functions. The touch component includes a plurality of touch electrodes for detecting touch signals and corresponding touch signal lines, and the display component includes a plurality of display electrodes for displaying images and corresponding display signal lines.

In particular, each touch electrode may have its own touch signal line for transferring a touch detecting signal to a touch detecting terminal. Thus, the wiring of the touch electrodes is substantially complex and occupying a large area, especially in a large size touch display and/or high precision touch display. Further, the touch component (e.g., touch electrodes, touch signal lines) and the display component may be fabricated by different manufacturing process, i.e., the display touch component may require extra fabrication steps. Thus, the fabrication process of the touch display may be complicated, and the fabrication cost may be high.

The present disclosure provides an improved array substrate, display panel including the array substrate and a corresponding display device. The array substrate may include a touch circuit and a plurality of independent touch electrodes arranged in an array. The touch circuit may include a plurality of first switching units, a controlling unit, and a plurality of touch detecting terminals. Each touch electrode may be electrically connected to one touch detecting terminal through at least one first switching unit. When the array substrate is in a touch detecting stage, the controlling unit may control the first switching units to be turned on, such that the touch electrodes may be detected, e.g., row by row, column by column, or in other predetermined detection patterns. The array substrate may have a simplified touch structure occupying a small area, thus, may be highly desired for thinner and lighter display devices.

Figure 1A:
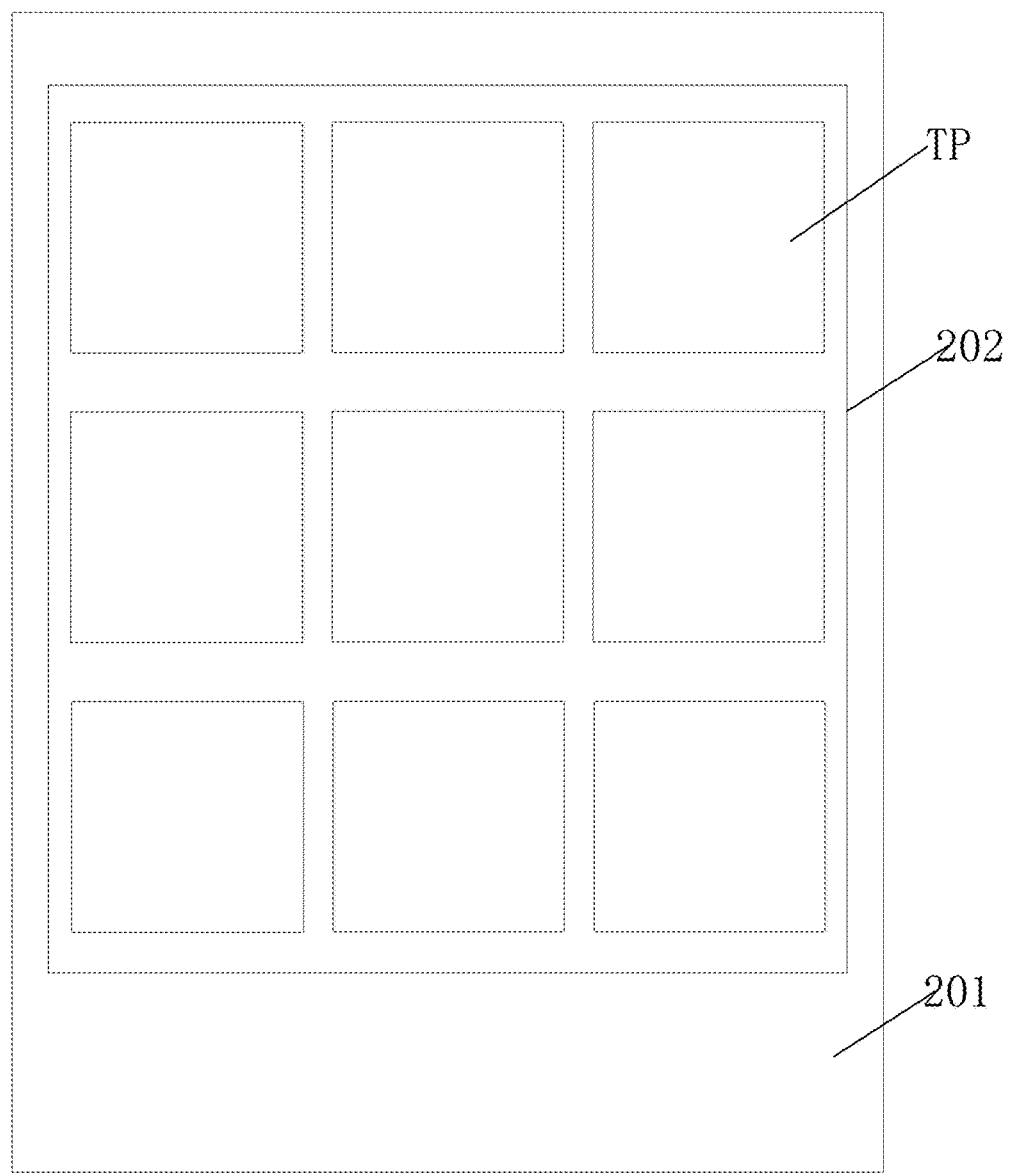
FIG. 1a illustrates a top view of an exemplary array substrate consistent with disclosed embodiments.

FIG. 1a illustrates a top view of an exemplary array substrate consistent with disclosed embodiments. As shown in FIG. 1a, the array substrate may include a non-display region 201 and a display region 202. The display region 202 may include a plurality of touch electrodes TP electrically isolated from each other, which may be arranged in an N×M array, where N is the number of the rows of the touch electrodes TP, i.e., the number of the touch electrode rows, while M is the number of the columns of the touch electrodes TP, i.e., the number of the touch electrode columns. N and M are positive integers. FIG. 1a illustrates a 3×3 touch electrode array, which is only for illustrative purpose, and is not intended to limit the scope of the present invention.

In one embodiment, the touch electrodes TP and a common electrode of the array substrate may be disposed in a same layer, i.e., the touch electrodes TP may be multiplexed as the common electrode, for example, through a time-multiplexing driving method, and the touch electrodes may be obtained through dividing the common electrode into a plurality of electrode blocks. In another embodiment, the touch electrodes TP and the common electrode may be disposed in different layers. Whether the touch electrodes TP and the common electrode are disposed in a same layer or different layers may be determined according to various fabrication process and application scenarios.

Further, the array substrate may also include a touch circuit (not drawn in FIG. 1a), which may include a plurality of first switching units, a controlling unit, and a plurality of touch detecting terminals. The electric connection (i.e., the wiring) among the touch electrodes TP, the first switching units, the controlling unit and the touch detecting terminals will be illustrated in FIG. 1b.

Figure 1B:
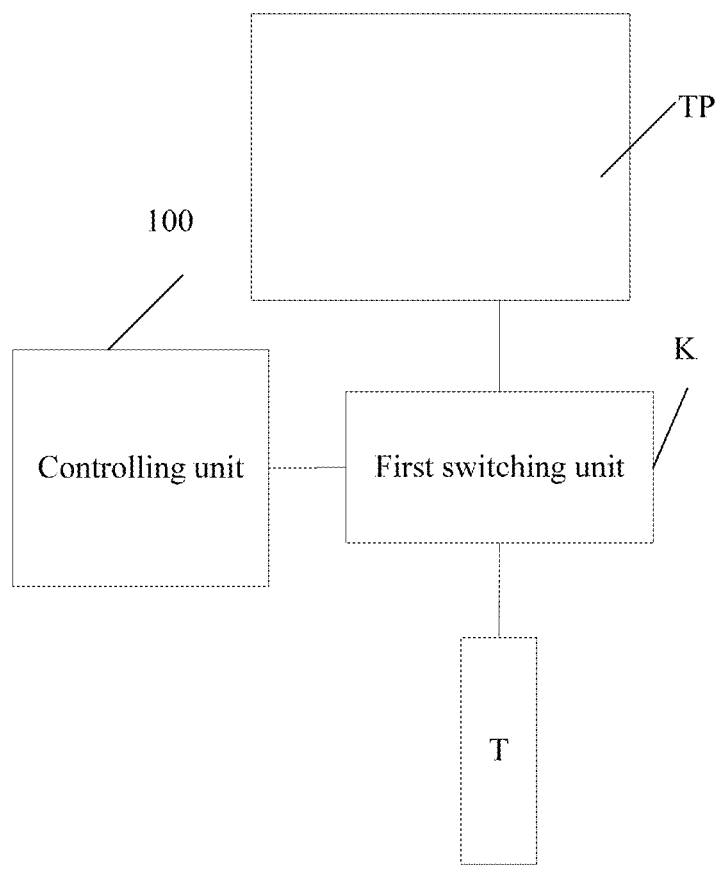
FIG. 1b illustrates an exemplary wiring diagram of a touch electrode consistent with disclosed embodiments.

FIG. 1b illustrates an exemplary wiring diagram of a touch electrode consistent with disclosed embodiments. As shown in FIG. 1b, the touch electrode TP may be electrically connected to a first terminal of at least one first switching unit K. The first switching unit K may have a second terminal electrically connected to a touch detecting terminal T, and a third terminal (e.g., a controlling terminal) electrically connected to a corresponding terminal (e.g., an output terminal) of a controlling unit 100. The controlling unit 100 may control the first switching unit K to be turned on/off. In one embodiment, as shown in FIG. 1b, the touch electrode TP may be electrically connected to the first terminal of one first switching unit K.

Referring to FIG. 1a and FIG. 1b, in the disclosed embodiments, the first switching units may be disposed in the display region 202 of the array substrate, for example, at a periphery region of the touch electrodes, while the controlling unit and the touch detecting terminals may be disposed in the non-display region 201 of the array substrate. In another embodiment, either of the first switching units, the controlling unit and the touch detecting terminals may be disposed in display region 202 or the non-display region 201 the of the array substrate.

Returning to FIG. 1b, the array substrate may be switched between a touch detecting stage and a displaying stage. In the disclosed embodiments, the touch detecting stage may be referred as a time period for the touch component to detect touch signals, and the displaying stage may be referred as a time period for the display component to receive grey scale data signals. In certain embodiments, the displaying stage may also include other time periods, for example, a time period for charging a voltage holding element in the display component.

When the array substrate is in the touch detecting stage, and the touch electrode TP is scanned, the controlling unit 100 may control the first switching unit K to be turned on, such that the touch detecting terminal T may be electrically connected to the touch electrode TP, enabling a detection of the touch electrode TP. That is, whether there are any changes in certain properties of the touch electrode TP may be detected. When the scanning of the touch electrode TP is completed, the controlling unit 100 may control the first switching unit K to be turned off, such that the electrical connection between the touch detecting terminal T and the touch electrode TP may be terminated accordingly.

In one embodiment, when the touch detecting terminal T is electrically connected to the touch electrode TP, changes of the self-capacitance in the touch electrode TP may be detected. In certain embodiments, when the touch detecting terminal T is electrically connected to the touch electrode TP, changes of mutual-capacitance, resistance, electromagnetics, and infrared optical signals, etc. in the touch electrode TP may be detected.

Further, the touch circuit may also include a plurality of second switching units and at least one reference signal terminal providing a reference signal, and each touch electrode may be electrically connected to the reference signal terminal through at least one second switching unit. When the array substrate is in the displaying stage, the controlling unit may control the first switching units to be turned off while the second switching units to be turned on, such that the reference signal may be transferred to the touch electrodes. When the array substrate is in the touch detecting stage, the controlling unit may control the first switching units to be turned on while the second switching units to be turned off, such that the touch electrodes may be progressively detected, e.g., row by row, column by column, or in other predetermined detection patterns. The corresponding wiring diagram of the touch electrode is illustrated in FIG. 2a.

Figure 2A:
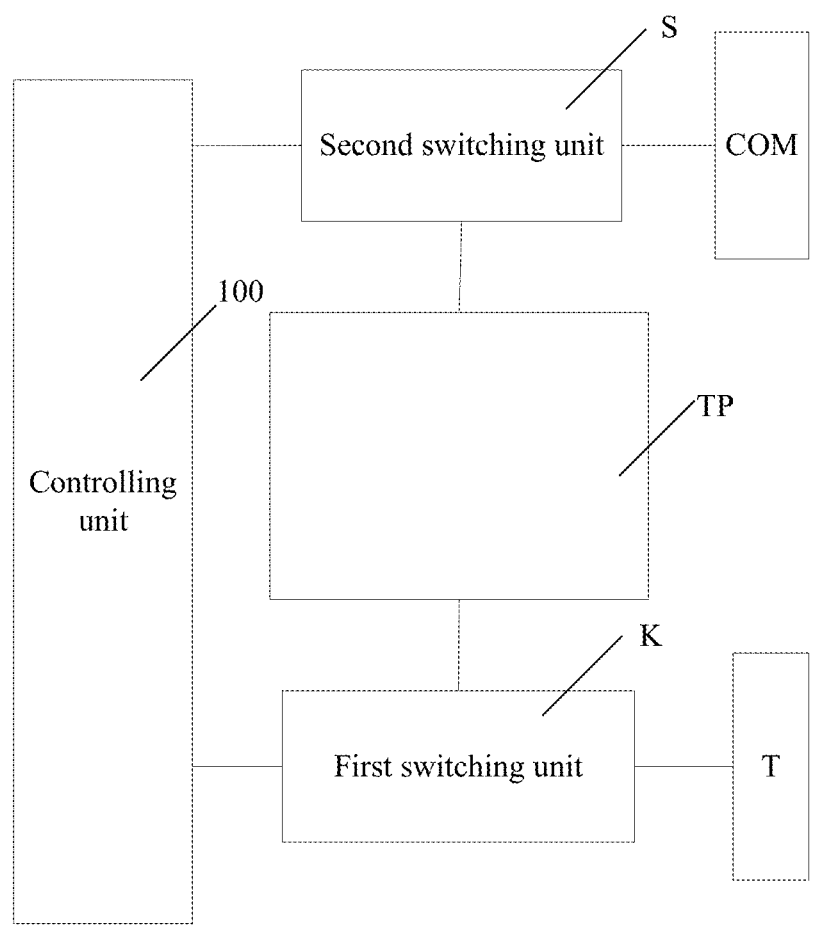
FIG. 2a illustrates another exemplary wiring diagram of a touch electrode consistent with disclosed embodiments.

FIG. 2a illustrates another exemplary wiring diagram of a touch electrode consistent with disclosed embodiments. As shown in FIG. 2a, the touch electrode TP may be electrically connected to a first terminal of at least one first switching unit K. The first switching unit K may have a second terminal electrically connected to a touch detecting terminal T, and a third terminal (e.g., a controlling terminal) electrically connected to a corresponding terminal (e.g., an output terminal) of a controlling unit 100. The controlling unit 100 may control the first switching unit K to be turned on/off.

Further, the touch electrode TP may also be electrically connected to a first terminal of at least one second switching unit S. The second switching unit S may have a second terminal electrically connected to a reference signal terminal COM, and a third terminal (e.g., a controlling terminal) electrically connected to a corresponding terminal of the controlling unit 100. The second switching unit S may be controlled to be turned on/off by the controlling unit 100. In one embodiment, as shown in FIG. 2a, the touch electrode TP may be electrically connected to the first terminal of one first switching unit K and, meanwhile, connected to the first terminal of one second switching unit S.

The array substrate may be switched between the touch detecting stage for detecting touch signals and the displaying stage for displaying images. When the array substrate is in the touch detecting stage, and the touch electrode TP is scanned, the controlling unit 100 may control the first switching unit K to be turned on while the second switching unit S to be turned off, such that the touch detecting terminal T may be electrically connected to the touch electrode TP, enabling the detection of the touch electrode TP. That is, whether there are any changes in certain properties of the touch electrode TP may be detected.

When the array substrate is in the displaying stage, the controlling unit 100 may control the first switching unit K to be turned off while the second switching unit S to be turned on, such that the reference signal from the reference signal terminal COM may be transferred to the touch electrode TP through the second switching unit S.

In the disclosed embodiments, the first switching unit K and the second switching unit S may be disposed in the display region of the array substrate, for example, at a periphery region of the touch electrode, while the controlling unit 100, the reference signal terminal COM and the touch detecting terminal T may be disposed in the non-display region 201. In another embodiment, either of the first switching unit K, the second switching unit S, the controlling unit 101, the reference signal terminal COM and the touch detecting terminal T may be disposed in the display region or non-display region of the array substrate.

In the disclosed embodiments, each of the first switching units and the second switching units may include at least one transistor. In one embodiment, each first switching unit may include at least one first type transistor, each second switching unit may include at least one second type transistor, and the first type transistors and the second type transistors may have a same type conductive channel. For example, all of the first type transistors and the second type transistors may be N-type transistors or P-type transistors, the N-type transistors may be N-type metal-oxide-semiconductor (NMOS) transistors, and the P-type transistors may be P-type metal-oxide-semiconductor (PMOS) transistors. The corresponding wiring diagram of the touch electrode is illustrated in FIG. 2b.

Figure 2B:
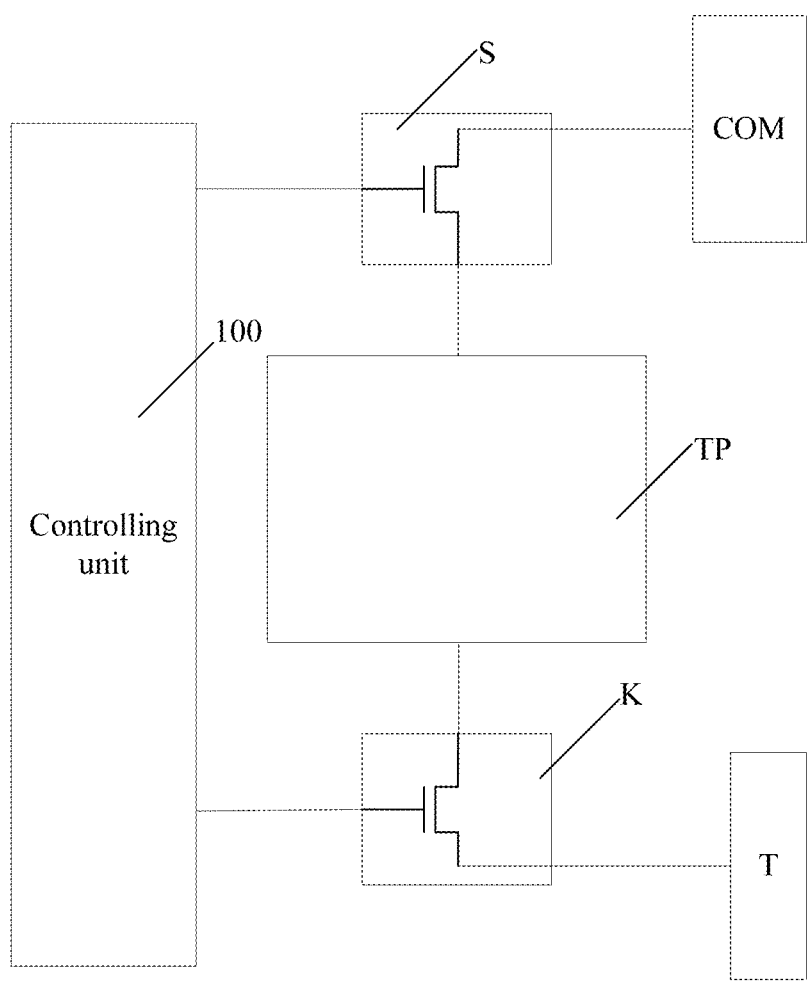
FIG. 2b illustrates another exemplary wiring diagram of a touch electrode consistent with disclosed embodiments.

FIG. 2b illustrates another exemplary wiring diagram of a touch electrode consistent with disclosed embodiments. The similarities between FIG. 2a and FIG. 2b are not repeated here, while certain difference may be illustrated. As shown in FIG. 2b, the touch pad TP may be electrically connected to one first switching unit K and the second switching unit S.

The first switching unit K may include one first type transistor, which may have a first terminal electrically connected to the touch electrode TP, a second terminal electrically connected to a touch detecting terminal T, and a third terminal (e.g., a controlling terminal) electrically connected to a corresponding terminal (e.g., an output terminal) of a controlling unit 100. The first type transistor in the first switching unit K may be controlled to be turned on/off by the controlling unit 100.

Further, the second switching unit S may include one second type transistor, which may have a first terminal electrically connected to the touch electrode TP, a second terminal electrically connected to a reference signal terminal COM, and a third terminal (e.g., a controlling terminal) electrically connected to a corresponding terminal (e.g., an output terminal) of the controlling unit 100. The second type transistor in the second switching unit S may be controlled to be turned on/off by the controlling unit 100.

The first type transistor and the second type transistor may have a same type conductive channel, for example, N-type transistors or P-type transistors. A transistor often has two inputs, called gate electrode and source electrode, and one output, called drain electrode. The N-type transistors may be turned on when a proper high-level signal is provided to the gate electrode, and turned off when a proper low-level signal is provided to the gate electrode. The P-type transistors may be turned on when a proper low-level signal is provided to the gate electrode, and turned off when a proper high-level signal is provided to the gate electrode.

The first type transistor and the second type transistor may be electrically connected to the controlling unit 100 through two different wires. That is, the third terminals (e.g., controlling terminals) of the first type transistor and the second type transistor may be electrically connected to different terminals (e.g., different output terminals) of the controlling unit 100, and the ON/OFF of the first type transistor and the ON/OFF second type transistor may be individually controlled.

For example, in the first type transistor, the third terminal electrically connected to the controlling unit 100 may be the gate electrode, the first terminal electrically connected to the touch electrode TP may be the source electrode, and the second terminal electrically connected to the touch detecting terminal T may be the drain electrode. Thus, when the display panel is in the touch detecting stage, the first type transistor may be turned on while the second type transistor may be turned off, such that any property changes in the touch electrode TP may be detected by the touch detecting terminal T.

In the second type transistor, the third terminal electrically connected to the controlling unit 100 may be the gate electrode, the second terminal electrically connected to the reference signal terminal COM may be the source electrode, and the first terminal electrically connected to the touch electrode TP may be the drain electrode. Thus, when the display panel is in the display stage, the second type transistor may be turned on while the first type transistor may be turned off, such that the reference signal from the reference signal terminal COM may be transferred to the touch electrode TP.

In another embodiment, each first switching unit may include at least one first type transistor, each second switching unit may include at least one second type transistor, and the first type transistor and the second type transistor may be configured to have different types of conductive channels, which may reduce the numbers of the wires. For example, the first type transistor may be an N-type transistor and the second type transistor may be a P-type transistor or vice versa. Thus, the first type transistor and the second type transistor corresponding to a same touch electrode may be electrically connected to the controlling unit through a same wire.

Figure 2C:
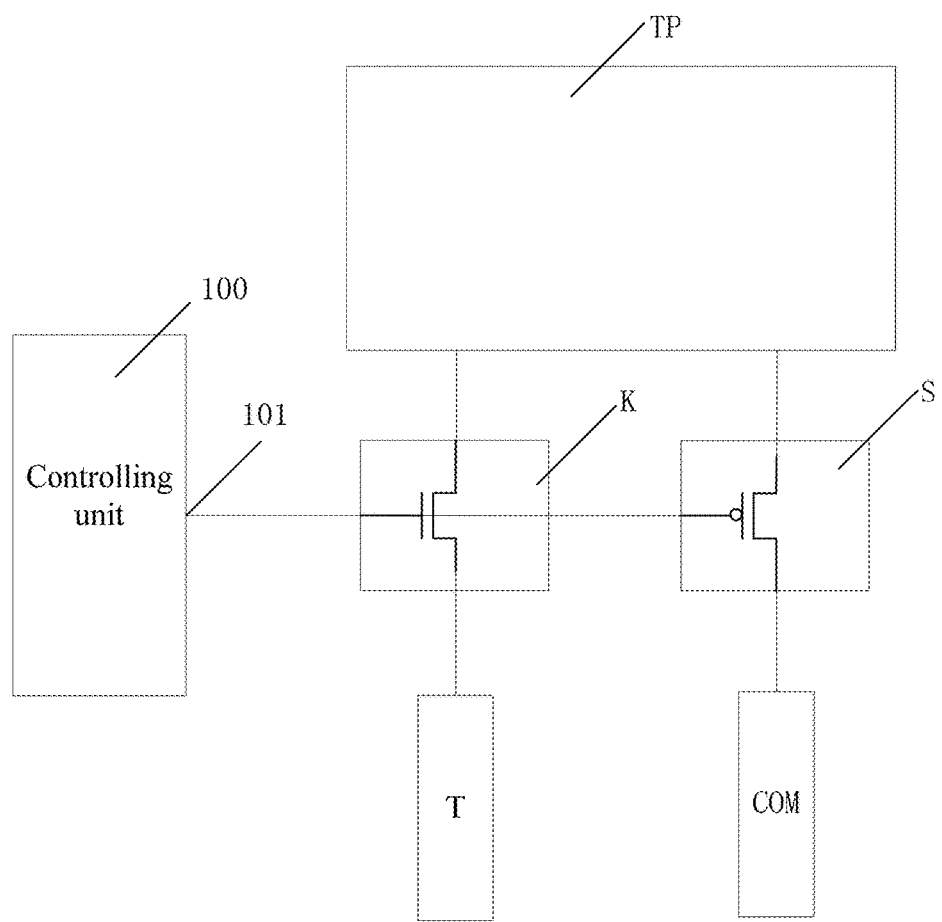
FIG. 2c illustrates another exemplary wiring diagram of a touch electrode consistent with disclosed embodiments.

When the array substrate is in the touch detecting stage, the controlling unit may output a proper voltage to turn on the first type transistor and turn off the second type transistor through the same wire. When the array substrate is in the displaying stage, the controlling unit may output a proper voltage to turn off the first type transistor and turn on the second type transistor through the same wire. The corresponding wiring diagram of the touch electrode is illustrated in FIG. 2c. The proper voltage may be determined based on properties of the transistor, for example, voltage-current curves of the first type transistor and the second type transistor.

FIG. 2c illustrates another exemplary wiring diagram of a touch electrode consistent with disclosed embodiments. The similarities between FIG. 2a and FIG. 2c are not repeated here, while certain difference may be illustrated. As shown in FIG. 2c, the first type transistor in the first switching unit K and the second type transistor in the second switching unit S may have different types of conductive channels. The third terminals (e.g., controlling terminals) of the first type transistor and the second type transistor may be electrically connected to a same terminal 101 (e.g., a same output terminal) of the controlling unit 100 through a same wire.

Figure 6:
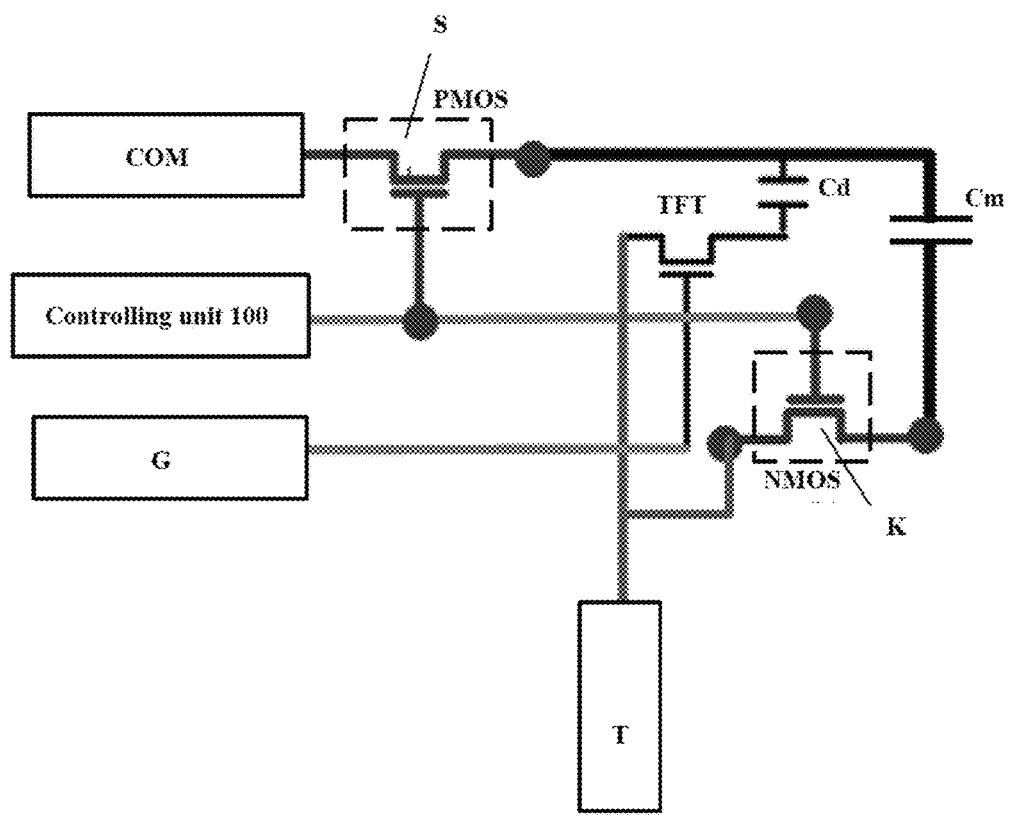
FIG. 6 illustrates an exemplary wiring diagram of a touch electrode and a display unit consistent with disclosed embodiments.

In one embodiment, the first type transistor may be an N-type transistor, and the second type transistor may be a P-type transistor. The corresponding wiring diagram of the touch electrode is illustrated in FIG. 6. FIG. 6 illustrates an exemplary wiring diagram of a touch electrode and a display unit consistent with disclosed embodiments. The similarities between FIG. 2c and FIG. 6 are not repeated here, while certain difference may be illustrated.

Figure 7:
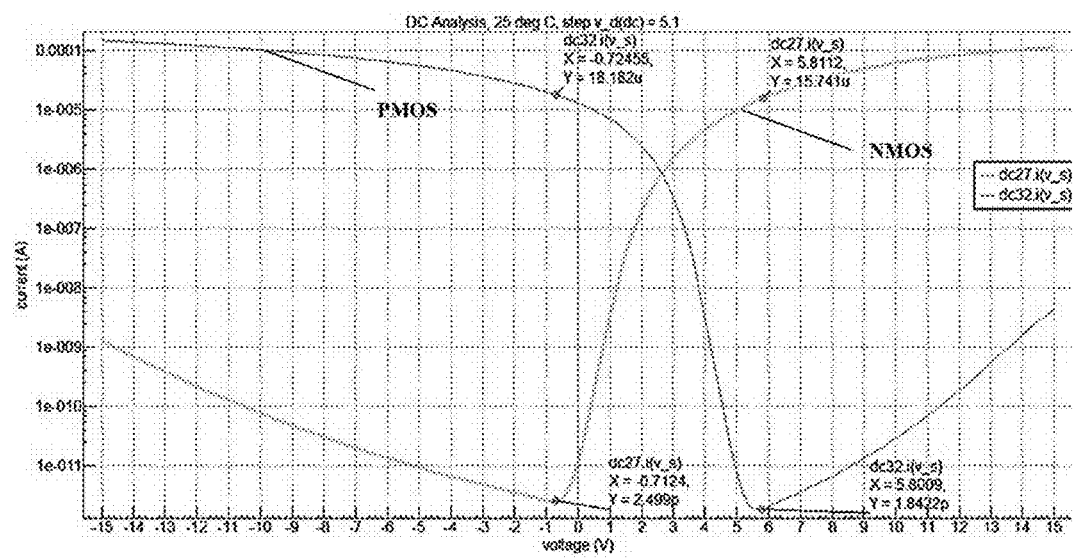
FIG. 7 illustrates exemplary voltage-current curves of a PMOS transistor and an NMOS transistor consistent with disclosed embodiments.

As shown in FIG. 6, the equivalent circuit of the touch electrode may be a capacitor Cm. The first type transistor in the first switching unit K may be an NMOS transistor, and the second type transistor in the second switching unit S may be a PMOS transistor. The PMOS transistor and the NMOS transistor may be electrically connected to a same output terminal of the controlling unit 100 through a same wire. FIG. 7 illustrates exemplary voltage-current curves of a PMOS transistor and a NMOS transistor consistent with disclosed embodiments. As shown in FIG. 7, under a proper gate voltage (e.g., 5-7V), the PMOS transistor may be turned off and the NMOS transistor may be turned on at the same time. Under another proper gate voltage (e.g., −3-0V), the PMOS transistor may be turned on and the NMOS transistor may be turned off at the same time.

Returning to FIG. 6, the display unit may include a display element and a display controlling element. The equivalent circuit of the display element may be a capacitor Cd. In one embodiment, the display element may include a pixel electrode, a common electrode and a liquid crystal layer sandwiched between the pixel electrode and the common electrode, and the display controlling element may be a thin-film transistor (TFT). The TFT may have a gate electrode electrically connected to a gate scanning terminal G, a source electrode electrically connected to the touch detecting terminal T, and a drain electrode electrically connected to the pixel electrode of the display element.

To achieve a compact integration of the touch component and the display component in the touch display, the reference signal terminal COM may also be a common signal terminal COM of the array substrate, for example, for inputting a common signal to the common electrode of the display element when the second switching unit S is turned on. The touch detecting terminal T may also be a data signal terminal T of the array substrate, for example, for inputting a data signal to the pixel electrode of the display element when the TFT is turned on. The touch electrode TP may be multiplexed as the common electrode of the display element.

When the array substrate is in the touch detecting stage, and the touch electrode TP is scanned, the controlling unit 100 may output a proper high-level signal to turn on the NMOS transistor and, meanwhile, turn off the PMOS transistor, such that the touch electrode TP may be electrically connected to the touch detecting terminal T, and any property changes in the touch electrode TP may be detected. The voltage of the proper high-level signal may be determined according to the When the array substrate is in the displaying stage, the gate scanning terminal G may output a scanning signal to turn on the TFT. The controlling unit 100 may output a proper low-level signal to turn off the NMOS transistor and, meanwhile, turn on the PMOS transistor. Thus, the common signal from the common signal terminal COM may be transferred to the common electrode of the display element and, meanwhile, the data signal from the data signal terminal T may be transferred to the pixel electrode of the display element. Due to a voltage difference between the common electrode and the pixel electrode, liquid crystal molecules in the liquid crystal layer may be reoriented and backlight transmittance may be modulated to display images.

It should be noted that, in one embodiment, as shown in FIG. 6, one touch electrode may correspond to one display unit, while in another embodiment, one touch one touch electrode may correspond to more than one display units. In addition, each of the first switching unit and the second switching unit shown in FIGS. 2a-2c only includes one transistor, which is only for illustrative purpose, and is not intended to limit the scope of the present invention. The first switching unit and the second switching may include any proper number of transistors, and the first switching unit and the second switching may include a same number of transistors or different numbers of transistors.

Figure 2D:
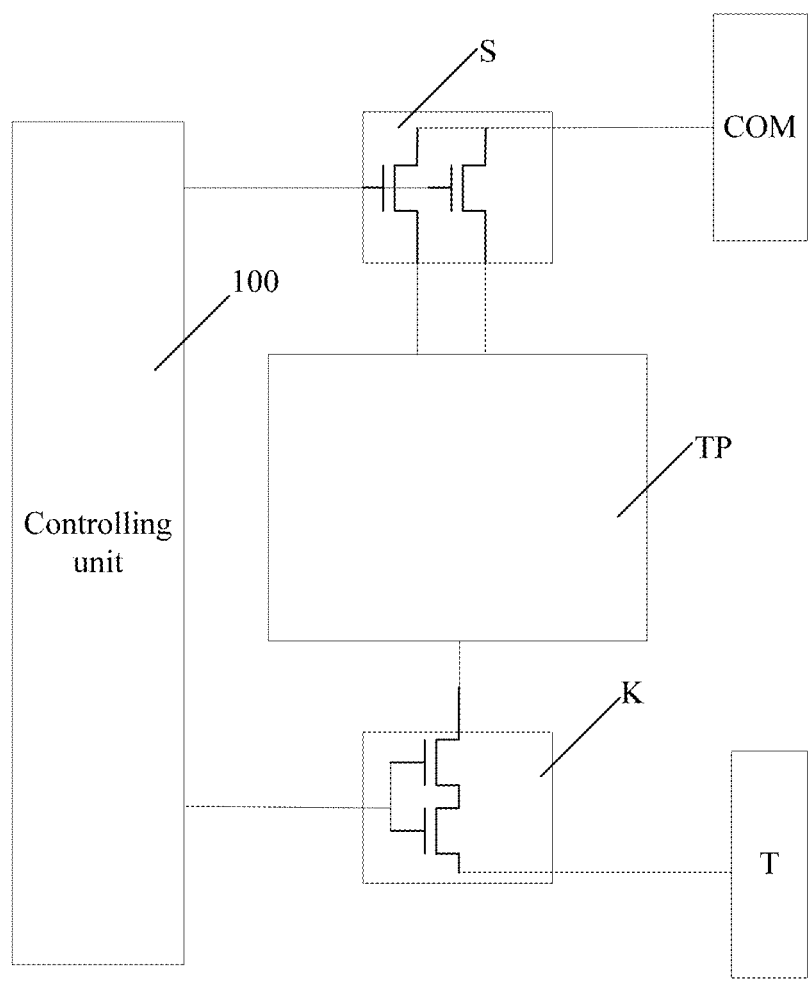
FIG. 2d illustrates another exemplary wiring diagram of a touch electrode consistent with disclosed embodiments.

FIG. 2d illustrates another exemplary wiring diagram of a touch electrode consistent with disclosed embodiments. The similarities between FIG. 2b and FIG. 2d are not repeated here, while certain difference may be illustrated. As shown in FIG. 2d, the first switching unit K may include a plurality of first type transistors connected in series, which may be electrically connected to the touch electrode TP and the touch detecting terminal T. The second switching unit S may include a plurality of second type transistors connected in parallel, which may be electrically connected to the touch electrode TP and the reference signal terminal COM.

Figure 8:
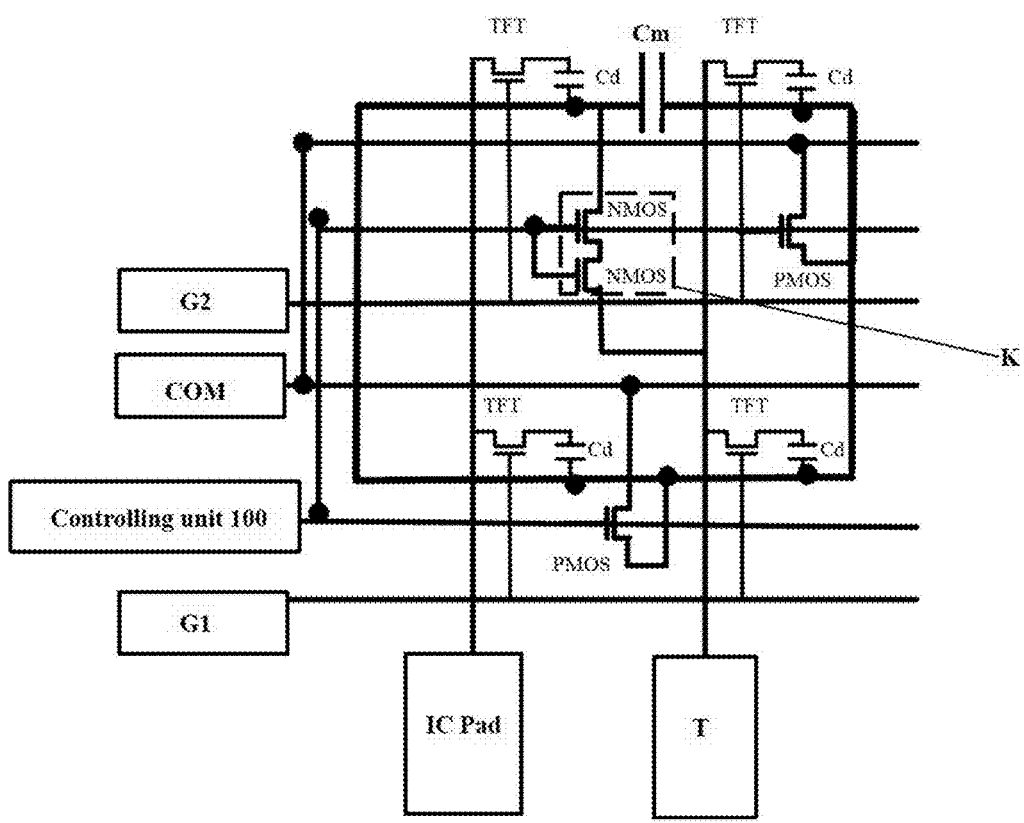
FIG. 8 illustrates an exemplary wiring diagram of a touch electrode and display units consistent with disclosed embodiments.

In one embodiment, as shown in FIG. 2d, the first switching unit K may include two first type transistors connected in series, and the second switching unit S may include two second type transistors connected in parallel. FIG. 8 illustrates an exemplary wiring diagram of a touch electrode and display units consistent with disclosed embodiments. The similarities between FIG. 6 and FIG. 8 are not repeated here, while certain difference may be illustrated.

As shown in FIG. 8, one touch electrode may correspond to a plurality of display units arranged in an array, for example, four display units arranged in a 2×2 array. The gate electrodes of the TFTs in the first row of the display units may be electrically connected to a gate scanning terminal G2, and the gate electrodes of the TFTs in the second row of the display units may be electrically connected to a gate scanning terminal G1. The first switching unit K may include two NMOS transistors connected in series, and the second switching unit may include two PMOS transistors connected in parallel. In particular, the PMOS transistors may be electrically connected to the common signal terminal COM through two different wires. In another embodiment, the PMOS transistors included in the second switching unit may be electrically connected to the common signal terminal COM through a same wire.

In the disclosed embodiments, the reference signal terminal COM may also be the common signal terminal of the array substrate, for example, for inputting the common signal to a common electrode disposed on the array substrate. The touch detecting terminals T may also be data signal terminals of the array substrate, for example, for inputting data signals to pixel electrodes disposed on the array substrate. That is, the reference signal terminal COM may be multiplexed as the common signal terminal, and the touch detecting terminals T may be multiplexed as the data signal terminals, for example, through a time-multiplexing driving method.

In one embodiment, the touch detecting terminal T may be multiplexed as the data signal terminal electrically connected to the source electrode of each TFT, for inputting data signals to the pixel electrode of each display element when the array substrate is in a display stage. In another embodiment, the touch detecting terminal T may be multiplexed as the data signal terminal electrically connected to the source electrodes of some TFTs, while the source electrodes of the other TFTs may be electrically connected to an IC pad including a plurality of data signal terminals for inputting data signals. For example, as shown in FIG. 8, two TFTs may be electrically connected to the IC pad, and the other two TFTs may be electrically connected to the touch detecting terminal T multiplexing as the data signal terminal.

Further, to reduce the number of the touch detecting terminals T and simplify the wiring of the array substrate, the first switching units corresponding to the touch electrodes TP in a same touch electrode column may be electrically connected to a same touch detecting terminal T.

It should be noted that, when the reference signal terminal COM is configured to be the common signal terminal of the array substrate, due to the significance of the common signal in displaying images, the second switching unit S for transferring the common signal may be desired to have a small on-state impedance. On the other hand, to minimize the signal crosstalk, the first switching unit K may be desired to have a large off-state impedance.

In one embodiment, the on-state impedance of the second switching unit S may be configured to be approximately below 50K Ohms, while the off-state impedance of the first switching unit K may be configured to be approximately below 5000K Ohms. As long as the on-state impedance of the second switching unit S is approximately below 50K Ohms and the off-state impedance of the first switching unit K is approximately below 5000K Ohms, the properties of the transistors and the arrangement of the transistors in the switching units may vary according to various application scenarios and fabrication process.

For example, as long as the on-state impedance of the second switching unit S is approximately below 50K Ohms and the off-state impedance of the first switching unit K is approximately below 5000K Ohms, the types of the transistors included in the switching unit, the series connection types of the transistors in the first switching unit, the parallel connection types of the transistors in the second switching unit, the width-to-length ratio of the channel in the transistors may vary according to various application scenarios and fabrication process.

For example, referring to FIG. 7, the width-to-length ratio (W/L) of the transistor is about 4/4, the drain voltage may be approximately VD=5.1V, the gate voltage may be approximately −3V-7V, the resistance of the NMOS transistor may be approximately 2×1012, and the resistance of the PMOS transistor may be approximately 2×105. Thus, to achieve an approximately below 50K Ohms on-state impedance of the second switching unit S and an approximately below 5000K Ohms off-state impedance of the first switching unit K is approximately below 5000K Ohms, the first switching unit may be configured to include 2-3 NMOS transistors connected in series, and the second switching unit may be configured to include 4-5 PMOS transistors connected in parallel or 2-3 PMOS transistors connected in parallel with a larger width-to-length ratio.

Figure 3A:
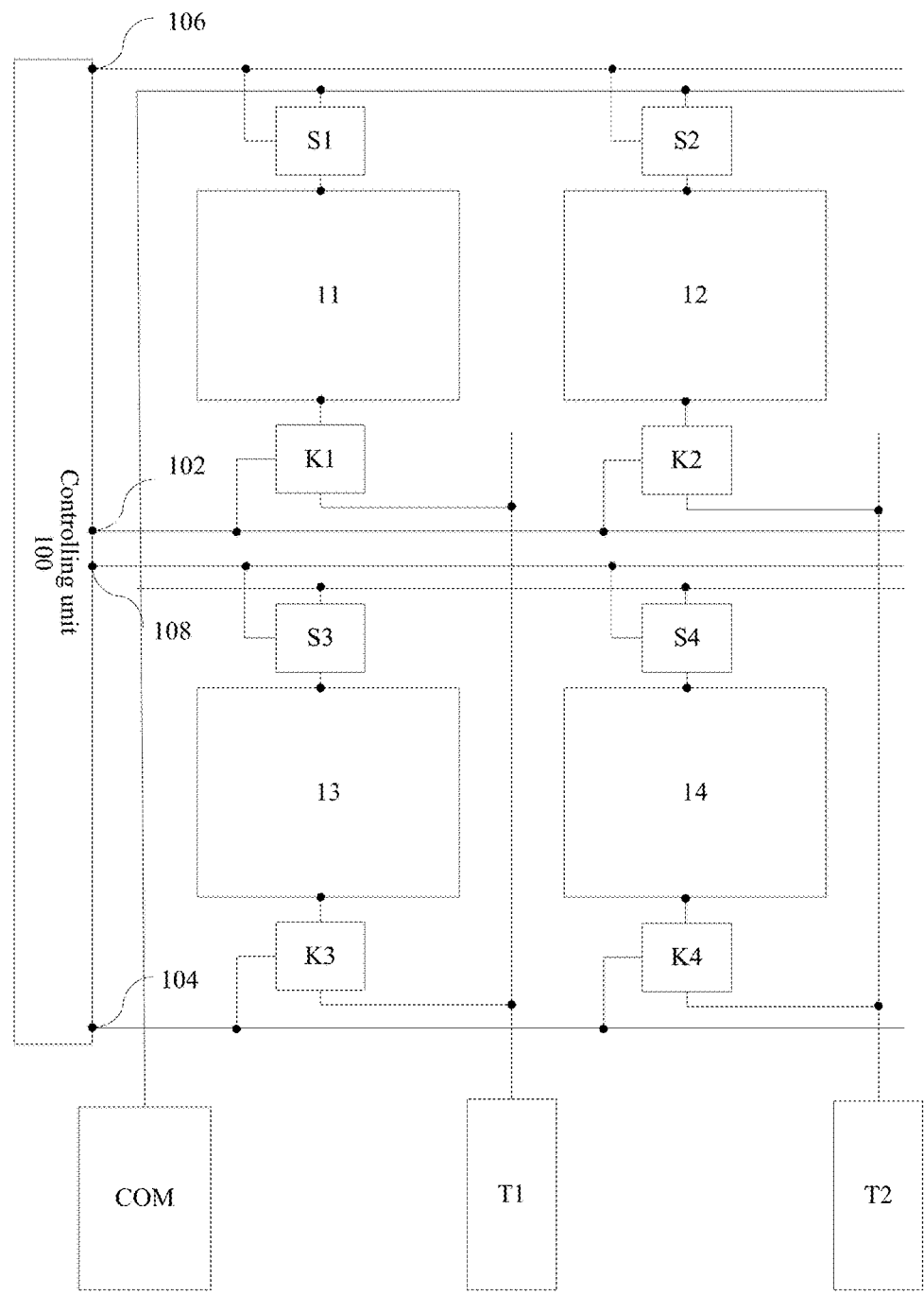
FIG. 3a illustrates a top view of another exemplary array substrate consistent with disclosed embodiments.

FIG. 3a illustrates a top view of another exemplary array substrate consistent with disclosed embodiments. The similarities between FIG. 2b and FIG. 3a are not repeated here, while certain differences may be illustrated. As shown in FIG. 3a, the array substrate may include a plurality of touch electrodes 11-14 arranged in an array, a plurality of first switching units K1-K4, a plurality of second switching units S1-S4, a plurality of touch detecting terminals T1-T2, a controlling unit 100, and at least one reference signal terminal COM.

In one embodiment, the first switching unit K1-K4 and the second switching unit S1-S4 may be disposed in the display region of the array substrate, for example, at a periphery region of the touch electrodes 11-14, while the controlling unit 100, the reference signal terminal COM and the touch detecting terminals T1-T2 may be disposed in the non-display region 201. In another embodiment, either of the first switching units K, the second switching unit S, the controlling unit 100, the reference signal terminal COM and the touch detecting terminals T may be disposed in the display region or the non-display region of the array substrate.

In one embodiment, as shown in FIG. 3a, the array substrate may include four touch electrodes arranged in a 2×2 array: a first touch electrode 11, a second touch electrode 12, a third touch electrode 13, and a fourth touch electrode 14. The array substrate may also include four first switching units K1-K4, four second switching units S1-S4, two touch detecting terminals T1-T2, one controlling unit 100, and one reference signal terminal COM.

In particular, each of the first touch electrode 11, the second touch electrode 12, the third touch electrode 13, and the fourth touch electrode 14 may be electrically connected to a first terminal of the first switching unit K1, K2, K3 and K4, respectively. To reduce the number of the touch detecting terminals T and simplify the wiring of the array substrate, the first switching units corresponding to the touch electrodes in a same touch electrode column may be electrically connected to a same touch detecting terminal.

That is, the second terminals of the first switching unit K1 and K3 may have be electrically connected to the touch detecting terminal T1, and the second terminals of the first switching unit K2 and K4 may have be electrically connected to the touch detecting terminal T2. Further, the third terminals (e.g., controlling terminals) of the first switching unit K1 and K2 may be electrically connected to a same terminal (e.g., a same output terminal) 102 of the controlling unit 100, while the third terminals (e.g., controlling terminals) of the first switching unit K3 and K4 may be electrically connected to a same terminal (e.g., a same output terminal) 104 of the controlling unit 100.

On the other hand, each of the first touch electrode 11, the second touch electrode 12, the third touch electrode 13, and the fourth touch electrode 14 may be electrically connected to first terminals of the second switching units S1, S2, S3 and S4, respectively. Second terminals of the second switching units S1, S2, S3 and S4 may be electrically connected to a reference signal terminal COM. Third terminals (e.g., controlling terminals) of the second switching units S1 and S2 may be electrically connected to a same terminal (e.g., a same output terminal) 106 of the controlling unit 100, and third terminals (e.g., controlling terminals) of the second switching units S3 and S4 may be electrically connected to a same terminal (e.g., a same output terminal) 108 of the controlling unit 100.

Each first switching unit K1-K4 may include at least one first type transistor, and each second switching unit S1-S4 may include at least one second type transistor. For example, the third terminal of the first type transistor connected to the controlling unit 100 may be the gate electrode, the second terminal of the first type transistor connected to the touch detecting terminal T1-T2 may be the drain electrode, and the first terminal of the first type transistor connected to the touch electrode 11-14 may be the source electrode. The third terminal of the second type transistor connected to the controlling unit 100 may be the gate electrode, the second terminal of the second type transistor connected to the reference signal terminal COM may be the source electrode, and the first terminal of the second type transistor connected to the touch electrode 11-14 may be the drain electrode.

In addition, the reference signal terminal COM may be multiplexed as the common signal terminal, and the touch detecting terminals T1-T2 may be multiplexed as the data signal terminals, for example, through a time-multiplexing driving method. The gate electrodes may be connected to the controlling unit 100 through gate electrode lines (e.g., scanning lines), and the source electrodes may be connected to the touch detecting terminals T1-T2 (i.e., data signal terminals) through data signal lines. A column direction of the touch electrode array may be an extending direction of the gate electrode lines, and a row direction of the touch electrode array may be an extending direction of the data lines.

In one embodiment, the first switching units K1-K4 and the second switching unit S1-S4 may be all N-type transistors, i.e., turned on when provided with a proper high-level signal, and turned off when provided with a proper low-level signal. The corresponding driving scheme of the array substrate is illustrated in FIG. 3b.

Figure 3B:
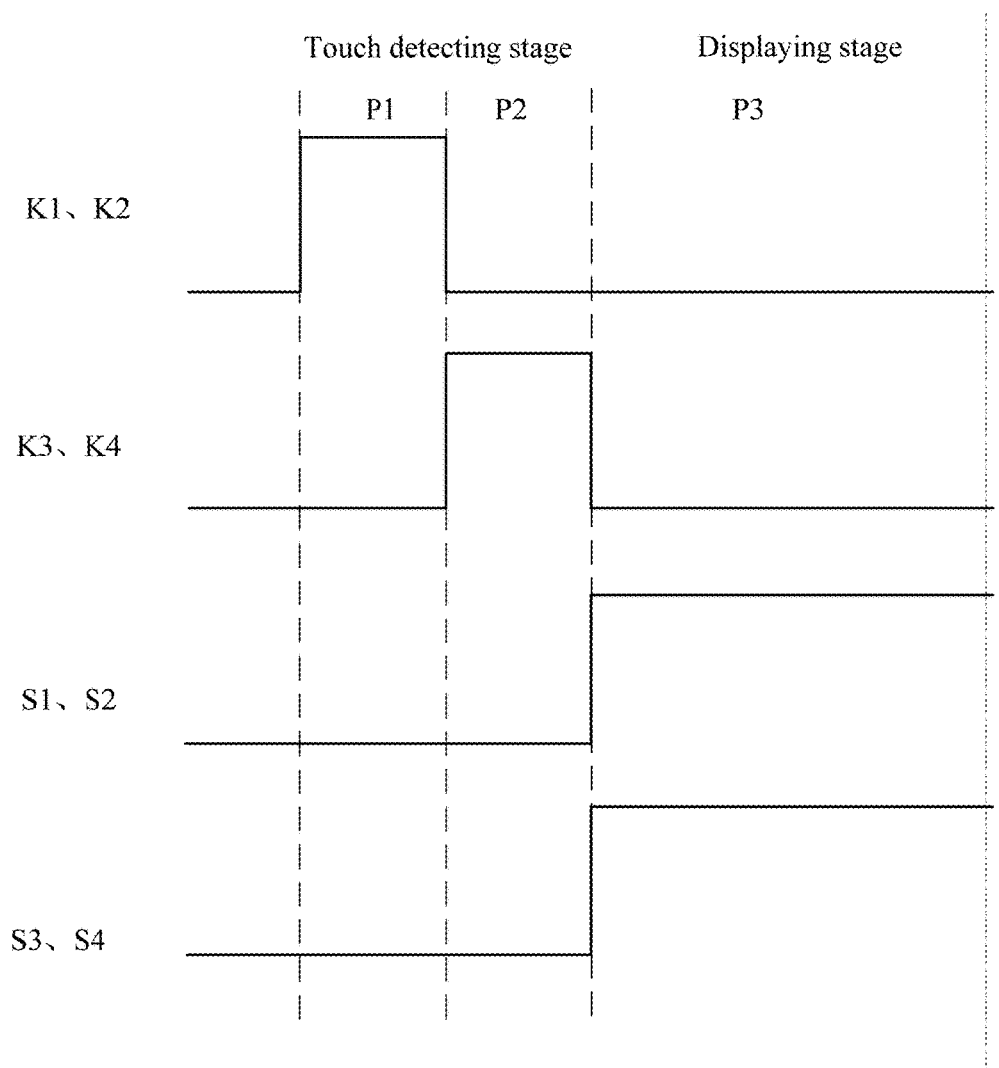
FIG. 3b illustrates an exemplary driving scheme of an exemplary array substrate in FIG. 3a consistent with disclosed embodiments.

FIG. 3b illustrates an exemplary driving scheme of an exemplary array substrate in FIG. 3a consistent with disclosed embodiments. As shown in FIG. 3b, when the array substrate is in the touch detecting stage, at a first time period P1, the controlling unit 100 may output a proper high-level signal to the first switching units K1 and K2 through the terminal 102, a proper low-level signal to the first switching units K3 and K4 through the terminal 104, a proper low-level signal to the second switching units S1 and S2 through the terminal 106, and a proper low-level signal to the second switching units S3 and S4 through the terminal 108. That is, the controlling unit 100 may control the first switching units K1 and K2 to be turned on, while control the first switching units K3 and K4 and the second switching units S1-S4 to be turned off during the first time period P1.

Thus, the touch detection terminal T1 may be electrically connected to the first touch electrode 11, detecting any property changes in the touch electrode 11. Similarly, the touch detection terminal T2 may be electrically connected to the first touch electrode 12, detecting any property changes in the touch electrode 12.

At a second time period P2, the controlling unit 100 may output a proper high-level signal to the first switching units K3 and K4 through the terminal 104, a proper low-level signal to the first switching units K1 and K2 through the terminal 102, a proper low-level signal to the second switching units S1 and S2 through the terminal 106, and a proper low-level signal to the second switching units S3 and S4 through the terminal 108. That is, the controlling unit 100 may control the first switching units K3 and K4 to be turned on, while control the first switching units K1 and K2 and the second switching units S1-S4 to be turned off during the second time period P2.

Thus, the touch detection terminal T3 may be electrically connected to the first touch electrode 13, detecting any property changes in the touch electrode 13. Similarly, the touch detection terminal T4 may be electrically connected to the first touch electrode 14, detecting any property changes in the touch electrode 14.

That is, when the array substrate is in the touch detecting stage, the controlling unit 100 may control the first switching units K1-K4 to be turned on row-by-row and, meanwhile control all the second switching units S1-S4 to be turned off, such that the touch electrodes 11-14 may be detected row by row. In certain embodiments, the touch electrodes 11-14 may be detected column by column, or in other predetermined detection patterns.

When the array substrate is the displaying stage, at a third time period P3, the controlling unit 100 may output a proper low-level signal to the first switching units K1 and K2 through the terminal 102, a proper low-level signal to the first switching units K3 and K4 through the terminal 104, a proper high-level signal to the second switching units S1 and S2 through the terminal 106, and a proper high-level signal to the second switching units S3 and S4 through the terminal 108. That is, the controlling unit 100 may control all the first switching units K1-K4 to be turned off, while control all the second switching units S1-S4 to be turned on during the third time period P3. Thus, the reference signal from the reference signal terminal COM may be transferred to the touch electrodes 11-14.

Figure 4:
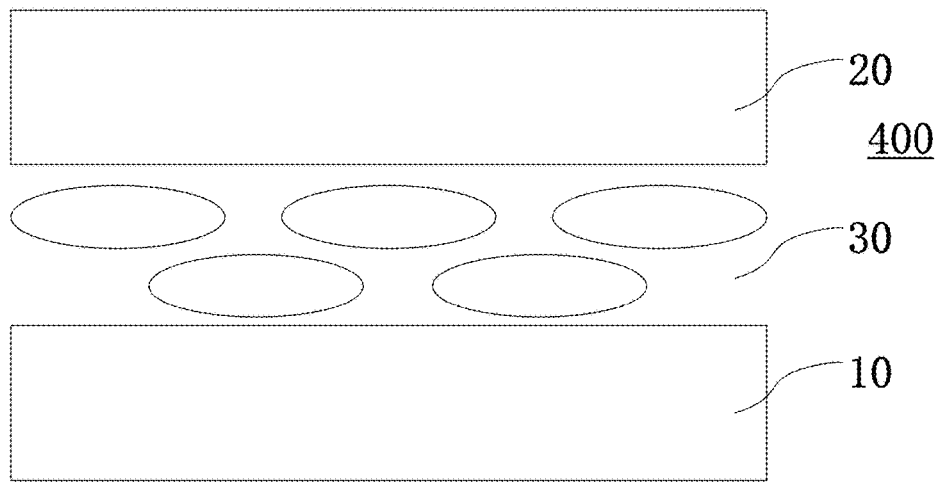
FIG. 4 illustrates a cross-sectional view of an exemplary display panel consistent with disclosed embodiments.

The present disclosure further provides a display panel. FIG. 4 illustrates a cross-sectional view of an exemplary display panel consistent with disclosed embodiments. As shown in FIG. 4, the display panel 400 may include any one of the disclosed array substrate 10, a first substrate 20 arranged opposite to the array substrate 10, and a display element 30 sandwiched between the first substrate 20 and the array substrate 10. In one embodiment, the touch electrodes may be disposed on an outer surface of the array substrate 10, i.e., through On-Cell technology. In another embodiment, the touch electrodes may be disposed on an inner surface of the array substrate 10, i.e., through In-Cell technology.

The display panel 400 may be any appropriate type of display panels including any one of the disclosed array substrate 10, such as plasma display panel (PDP), field emission display (FED) panel, liquid crystal display (LCD) panel, organic light-emitting diode (OLED) display panel, light-emitting diode (LED) display panel, quantum dots (QDs) display panel or other types of display panels. In one embodiment, as shown in FIG. 4, the first substrate 20 may be a color film substrate, and the display element 30 may be a liquid crystal layer sandwiched between the first substrate 20 and the array substrate 10.

Figure 5:
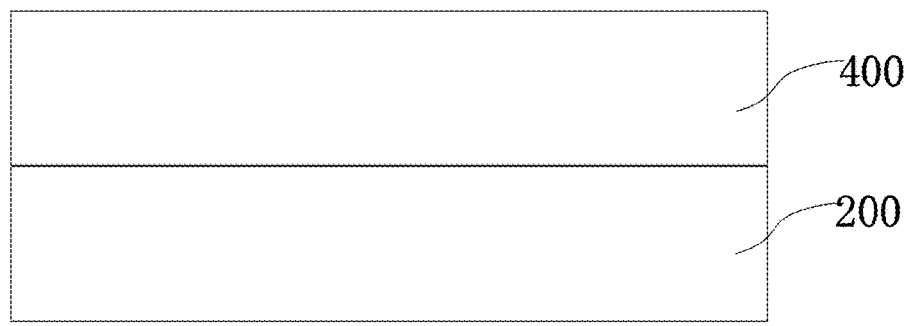
FIG. 5 illustrates a cross-sectional view of an exemplary display device consistent with disclosed embodiments.

FIG. 5 illustrates a cross-sectional view of an exemplary display device consistent with disclosed embodiments. As shown in FIG. 5, the display device may include any one of the disclosed display panel 400, and a backlight module 200 arranged opposite to the display panel 400. For example, the display device may be a smartphone, a tablet, a wearable device, etc., which is capable of displaying images and/or videos. Further, the display device may be any electronic device or any electronic component capable of displaying images and/or videos and including any one of the disclosed display panel 400. Because the display device includes any one of the disclosed display panel, the display device may also exhibit the same advantages as the disclosed display panel.

In the disclosed embodiments, the array substrate may include a touch circuit and a plurality of independent touch electrodes arranged in an array. Each touch electrode may be electrically connected to one touch detecting terminal through at least one first switching unit, and electrically connected to the reference signal terminal through at least one second switching unit. When the array substrate is in a touch detecting stage, the controlling unit may control the first switching units to be turned on while the second switching units to be turned off, such that the touch electrodes may be detected row by row. When the array substrate is in the displaying stage, the controlling unit may control the first switching units to be turned off while the second switching units to be turned on, such that the reference signal may be transferred to the touch electrodes.

Further, to achieve a compact integration of the touch component and the display component in the touch display, the reference signal terminal may be multiplexed as the common signal terminal of the array substrate, and the touch detecting terminal may be multiplexed as the data signal terminal T of the array substrate, and the touch electrode may be multiplexed as the common electrode of the display element. The array substrate may have a simplified touch structure occupying a small area, the fabrication process may be simplified, and the fabrication cost as well as the power consumption may be reduced. The corresponding display device may satisfy the market demand for thinner and lighter display devices.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An array substrate, comprising:
a touch circuit including a plurality of first switching units, a controlling unit, and a plurality of touch detecting terminals;
a plurality of independent touch electrodes arranged in an array;
a plurality of second switching units: and
at least one reference signal terminal providing a reference signal
wherein;
a touch electrode is electrically connected to a touch detecting terminal through at least one of the plurality of first switching units, and electrically connected to the at least one reference signal terminal through at least one of the plurality of second switching units,
when the array substrate is in a touch detecting stage, the controlling unit controls the first switching units to be turned on while the second switching units to be turned off such that the touch electrodes are progressively detected,
when the array substrate is in a displaying stage, the controlling unit controls the first switching units to be turned off while the second switching units to be turned on, such that the reference signal is transferred to the touch electrodes from the at least one reference signal terminal,
the array substrate includes a non-display region and a display region, and the plurality of first switching units and the plurality of second switching units are disposed in the display region,
a first switching unit includes at least one first type transistor, wherein the at least one first type transistor has a gate electrode electrically connected to the controlling unit, a source electrode electrically connected to the touch electrode, and a drain electrode electrically connected to the touch detecting terminal, and
a second switching unit includes at least one second type transistor, wherein the at least one second type transistor has a gate electrode electrically connected to the controlling unit, a source electrode electrically connected to the at least one reference signal terminal and a drain electrode electrically connected to the touch electrode.

2. The array substrate according to claim 1, wherein:
when the array substrate is in the touch detecting stage, the controlling unit controls the first switching units to be turned on, such that the touch electrodes are detected row by row.

3. The array substrate according to claim 1, wherein:
when the array substrate is in the touch detecting stage, the controlling unit controls the first switching units to be turned on while the second switching units to be turned off, such that the touch electrodes are detected row by row.

4. The array substrate according to claim 1, wherein:
a first switching unit includes at least one first type transistor; and
a second switching unit includes at least one second type transistor,
wherein the at least one first type transistor and the at least one second type transistor have a same type conductive channel.

5. The array substrate according to claim 1, wherein:
a first switching unit includes at least one first type transistor; and
a second switching unit includes at least one second type transistor,
wherein the at least one first type transistor and the at least one second type transistor have different types of conductive channels.

6. The array substrate according to claim 5, wherein:
the first switching unit and the second switching unit electrically connected to a same touch electrode are electrically connected to the controlling unit through a same wire.

7. The array substrate according to claim 5, wherein:
the at least one first type transistor is an N-type transistor; and the at least one second type transistor is a P-type transistor.

8. The array substrate according to claim 5, wherein:
the first switching unit includes a plurality of first type transistors connected in series,
wherein the plurality of first type transistors are electrically connected to the touch electrode and the touch detecting terminal.

9. The array substrate according to claim 5, wherein:
the second switching unit includes a plurality of second type transistors connected in parallel,
wherein the plurality of second type transistors are electrically connected to the touch electrode and the reference signal terminal.

10. The array substrate according to claim 1, wherein:
the at least one reference signal terminal is also a common signal terminal of the array substrate.

11. The array substrate according to claim 1, further including:
a common electrode disposed in a same layer of the touch electrodes.

12. The array substrate according to claim 1, wherein:
the touch detecting terminal is also a data signal terminal of the array substrate.

13. The array substrate according to claim 1, wherein:
the first switching units corresponding to the touch electrodes in a same touch electrode column are electrically connected to a same touch detecting terminal.

14. The array substrate according to claim 1, wherein:
the first switching units corresponding to the touch electrodes in a same touch electrode row are electrically connected to the controlling unit through a same wire.

15. A display panel comprising an array substrate according to claim 1.

16. A display device comprising a display panel according to claim 15.

* * * * *